US008983860B1

(12) United States Patent
Beda, III et al.

(10) Patent No.: US 8,983,860 B1
(45) Date of Patent: Mar. 17, 2015

(54) ADVERTISING AUCTION SYSTEM

(75) Inventors: Joseph S. Beda, III, Seattle, WA (US); Craig I. McLuckie, Sammamish, WA (US)

(73) Assignee: Google Inc., Mountain View, CA (US)

( * ) Notice: Subject to any disclaimer, the term of this patent is extended or adjusted under 35 U.S.C. 154(b) by 268 days.

(21) Appl. No.: 13/361,876

(22) Filed: Jan. 30, 2012

(51) Int. Cl.
*G06Q 30/00* (2012.01)
*G06Q 30/02* (2012.01)
*H04L 12/14* (2006.01)

(52) U.S. Cl.
CPC ............ *G06Q 30/0275* (2013.01); *H04L 12/14* (2013.01)
USPC .................... 705/14.71; 705/14.53; 705/14.49

(58) Field of Classification Search
CPC ... G06Q 30/02; G06Q 30/0275; G06Q 30/08; G06F 15/16; H04L 12/14
See application file for complete search history.

(56) References Cited

U.S. PATENT DOCUMENTS

| | | |
|---|---|---|
| 5,463,768 A | 10/1995 | Cuddihy et al. |
| 5,655,081 A | 8/1997 | Bonnell et al. |
| 5,778,444 A | 7/1998 | Langan et al. |
| 5,794,224 A | 8/1998 | Yufik |
| 6,148,368 A | 11/2000 | DeKoning |
| 6,178,482 B1 | 1/2001 | Sollars |
| 6,449,671 B1 | 9/2002 | Patkar et al. |
| 6,505,211 B1 | 1/2003 | Dessloch et al. |
| 6,505,248 B1 | 1/2003 | Casper et al. |
| 6,587,866 B1 | 7/2003 | Modi et al. |
| 6,598,179 B1 | 7/2003 | Chirashnya et al. |
| 6,643,613 B2 | 11/2003 | McGee et al. |
| 6,829,678 B1 | 12/2004 | Sawdon et al. |
| 6,891,839 B2 | 5/2005 | Albert et al. |
| 6,898,697 B1 | 5/2005 | Gao et al. |
| 6,996,502 B2 | 2/2006 | De La Cruz et al. |
| 7,043,455 B1 | 5/2006 | Cuomo et al. |

(Continued)

FOREIGN PATENT DOCUMENTS

| | | |
|---|---|---|
| EP | 0909058 | 7/2010 |
| WO | WO 2011/095516 | 8/2011 |
| WO | WO 2012/039834 | 3/2012 |

OTHER PUBLICATIONS

Breitgand, David, and Amir Epstein. "SLA-aware placement of multi-virtual machine elastic services in compute clouds." Integrated Network Management (IM), 2011 IFIP/IEEE International Symposium on. IEEE, 2011.*

(Continued)

*Primary Examiner* — Gurkanwaljit Singh
(74) *Attorney, Agent, or Firm* — Fish & Richardson P.C.

(57) ABSTRACT

Methods, systems, and apparatus, including computer programs encoded on a computer storage medium, for an advertisement auction system. In one aspect, a method includes operating bidders on a data processing apparatus, each bidder executing in a distinct virtual machine, wherein a host operating system that executes on the data processing apparatus performs operations including: receiving an advertisement bid request from a requestor using a first communication protocol, the bid request identifying a bidder, the data processing apparatus and the ad exchange being on a same internal network; sending the advertisement bid request to the virtual machine of the identified bidder using a second communication protocol; receiving an advertisement bid response for the bid request from the identified bidder using the second communication protocol; and sending the advertisement bid response to the requestor using the first communication protocol.

30 Claims, 5 Drawing Sheets

(56) References Cited

U.S. PATENT DOCUMENTS

| | | |
|---|---|---|
| 7,062,718 B2 | 6/2006 | Kodosky et al. |
| 7,117,243 B2 | 10/2006 | Peart |
| 7,466,703 B1 | 12/2008 | Arunachalam et al. |
| 7,478,388 B1 | 1/2009 | Chen et al. |
| 7,500,262 B1 | 3/2009 | Sanin et al. |
| 7,529,836 B1 | 5/2009 | Bolen et al. |
| 7,584,467 B2 | 9/2009 | Wickham et al. |
| 7,596,620 B1 | 9/2009 | Colton et al. |
| 7,650,331 B1 | 1/2010 | Dean et al. |
| 7,653,833 B1 | 1/2010 | Miller et al. |
| 7,761,573 B2 | 7/2010 | Travostino et al. |
| 7,804,862 B1 | 9/2010 | Olson et al. |
| 7,836,285 B2 | 11/2010 | Giri et al. |
| 8,051,414 B2 | 11/2011 | Stender et al. |
| 8,065,717 B2 | 11/2011 | Band |
| 8,103,771 B2 | 1/2012 | Tanaka et al. |
| 8,108,903 B2 | 1/2012 | Norefors et al. |
| 8,146,147 B2 | 3/2012 | Litvin et al. |
| 8,261,295 B1 | 9/2012 | Risbood et al. |
| 8,276,140 B1 | 9/2012 | Beda et al. |
| 8,296,459 B1 | 10/2012 | Brandwine et al. |
| 8,407,687 B2 | 3/2013 | Moshir et al. |
| 8,423,993 B2 | 4/2013 | Faus et al. |
| 8,484,353 B1 | 7/2013 | Johnson et al. |
| 8,504,844 B2 | 8/2013 | Browning |
| 8,533,796 B1 | 9/2013 | Shenoy et al. |
| 2002/0091902 A1 | 7/2002 | Hirofuji |
| 2002/0097747 A1 | 7/2002 | Kirkby |
| 2004/0139368 A1 | 7/2004 | Austen et al. |
| 2004/0148484 A1 | 7/2004 | Watanabe et al. |
| 2004/0210653 A1 | 10/2004 | Kanoor et al. |
| 2005/0010715 A1 | 1/2005 | Davies et al. |
| 2005/0166011 A1 | 7/2005 | Burnett et al. |
| 2005/0196030 A1 | 9/2005 | Schofield et al. |
| 2005/0216659 A1 | 9/2005 | Ogawa et al. |
| 2005/0237543 A1 | 10/2005 | Kikuchi |
| 2005/0289499 A1 | 12/2005 | Ogawa et al. |
| 2006/0026354 A1 | 2/2006 | Lesot et al. |
| 2006/0048077 A1 | 3/2006 | Boyles |
| 2006/0048130 A1 | 3/2006 | Napier et al. |
| 2006/0059228 A1 | 3/2006 | Kasamsetty et al. |
| 2006/0067236 A1 | 3/2006 | Gupta |
| 2006/0075199 A1 | 4/2006 | Kallahalla et al. |
| 2006/0098618 A1 | 5/2006 | Bouffioux |
| 2006/0136676 A1 | 6/2006 | Park et al. |
| 2006/0153099 A1 | 7/2006 | Feldman |
| 2006/0161753 A1 | 7/2006 | Aschoff et al. |
| 2006/0247971 A1* | 11/2006 | Dresden et al. ................ 705/14 |
| 2006/0271547 A1 | 11/2006 | Chen et al. |
| 2007/0011361 A1 | 1/2007 | Okada et al. |
| 2007/0112956 A1 | 5/2007 | Chapman et al. |
| 2007/0118694 A1 | 5/2007 | Watanabe et al. |
| 2007/0123276 A1 | 5/2007 | Parker et al. |
| 2007/0177198 A1 | 8/2007 | Miyata |
| 2007/0199058 A1 | 8/2007 | Baumgart et al. |
| 2007/0271604 A1 | 11/2007 | Webster et al. |
| 2007/0280243 A1 | 12/2007 | Wray et al. |
| 2008/0028389 A1 | 1/2008 | Genty et al. |
| 2008/0086515 A1 | 4/2008 | Bai et al. |
| 2008/0095176 A1 | 4/2008 | Ong et al. |
| 2008/0107112 A1 | 5/2008 | Kuo et al. |
| 2008/0205415 A1 | 8/2008 | Morales |
| 2008/0208681 A1 | 8/2008 | Hammad et al. |
| 2008/0215796 A1 | 9/2008 | Lam et al. |
| 2008/0222246 A1 | 9/2008 | Ebling et al. |
| 2008/0222375 A1 | 9/2008 | Kotsovinos et al. |
| 2008/0244030 A1 | 10/2008 | Leitheiser |
| 2008/0244471 A1 | 10/2008 | Killian et al. |
| 2008/0250407 A1 | 10/2008 | Dadhia et al. |
| 2008/0270704 A1 | 10/2008 | He et al. |
| 2008/0304516 A1 | 12/2008 | Feng et al. |
| 2008/0307258 A1 | 12/2008 | Challenger et al. |
| 2008/0310328 A1 | 12/2008 | Li et al. |
| 2009/0097657 A1 | 4/2009 | Scheidt et al. |
| 2009/0150629 A1 | 6/2009 | Noguchi et al. |
| 2009/0199177 A1 | 8/2009 | Edwards et al. |
| 2009/0222815 A1 | 9/2009 | Dake |
| 2009/0241108 A1 | 9/2009 | Edwards et al. |
| 2009/0249440 A1 | 10/2009 | Platt et al. |
| 2009/0276771 A1 | 11/2009 | Nickolov et al. |
| 2009/0282266 A1 | 11/2009 | Fries et al. |
| 2009/0300605 A1 | 12/2009 | Edwards et al. |
| 2009/0310554 A1 | 12/2009 | Sun et al. |
| 2010/0017859 A1 | 1/2010 | Kelly |
| 2010/0023582 A1 | 1/2010 | Pedersen et al. |
| 2010/0046426 A1 | 2/2010 | Shenoy et al. |
| 2010/0057913 A1 | 3/2010 | DeHaan |
| 2010/0071035 A1 | 3/2010 | Budko et al. |
| 2010/0088335 A1 | 4/2010 | Mimatsu |
| 2010/0094999 A1 | 4/2010 | Rama et al. |
| 2010/0095000 A1 | 4/2010 | Kettler et al. |
| 2010/0199089 A1 | 8/2010 | Vysogorets et al. |
| 2010/0212004 A1 | 8/2010 | Fu |
| 2010/0215050 A1 | 8/2010 | Kanada |
| 2010/0217927 A1 | 8/2010 | Song |
| 2010/0235649 A1 | 9/2010 | Jeffries et al. |
| 2010/0262498 A1* | 10/2010 | Nolet et al. ................ 705/14.71 |
| 2010/0274984 A1 | 10/2010 | Inomata et al. |
| 2010/0287548 A1 | 11/2010 | Zhou et al. |
| 2010/0293285 A1 | 11/2010 | Oishi et al. |
| 2010/0303241 A1 | 12/2010 | Breyel |
| 2011/0010483 A1 | 1/2011 | Liljeberg |
| 2011/0022812 A1 | 1/2011 | van der Linden et al. |
| 2011/0055361 A1 | 3/2011 | DeHaan |
| 2011/0085563 A1 | 4/2011 | Kotha et al. |
| 2011/0119128 A1* | 5/2011 | Fang et al. ................ 705/14.49 |
| 2011/0153838 A1 | 6/2011 | Belkine et al. |
| 2011/0191485 A1 | 8/2011 | Umbehocker |
| 2011/0191768 A1 | 8/2011 | Smith |
| 2011/0231242 A1* | 9/2011 | Dilling et al. ............. 705/14.42 |
| 2011/0231280 A1 | 9/2011 | Farah |
| 2011/0246267 A1* | 10/2011 | Williams et al. ............. 705/14.4 |
| 2011/0246285 A1* | 10/2011 | Ratnaparkhi et al. ...... 705/14.42 |
| 2011/0246297 A1* | 10/2011 | Buchalter et al. .......... 705/14.53 |
| 2011/0246298 A1* | 10/2011 | Williams et al. ............ 705/14.53 |
| 2011/0246310 A1* | 10/2011 | Buchalter et al. .......... 705/14.71 |
| 2011/0258441 A1 | 10/2011 | Ashok et al. |
| 2012/0101907 A1* | 4/2012 | Dodda ........................ 705/14.73 |
| 2012/0158456 A1* | 6/2012 | Wang et al. ................... 705/7.31 |
| 2012/0185688 A1 | 7/2012 | Thornton |
| 2012/0191912 A1 | 7/2012 | Kadatch et al. |
| 2012/0233678 A1 | 9/2012 | Pal |
| 2012/0233705 A1 | 9/2012 | Boysen et al. |
| 2012/0246637 A1 | 9/2012 | Kreeger et al. |
| 2012/0266159 A1 | 10/2012 | Risbood et al. |
| 2012/0310729 A1* | 12/2012 | Dalto et al. ................ 705/14.43 |
| 2013/0074181 A1 | 3/2013 | Singh |
| 2013/0081014 A1 | 3/2013 | Kadatch et al. |
| 2013/0085867 A1* | 4/2013 | Gao et al. ................... 705/14.71 |
| 2013/0117801 A1 | 5/2013 | Shieh et al. |
| 2013/0159093 A1* | 6/2013 | Chavan ...................... 705/14.45 |
| 2013/0212709 A1 | 8/2013 | Tucker |
| 2013/0227303 A1 | 8/2013 | Kadatch et al. |
| 2013/0262405 A1 | 10/2013 | Kadatch et al. |

OTHER PUBLICATIONS

Chard, Kyle, et al. "Social cloud computing: A vision for socially motivated resource sharing." Services Computing, IEEE Transactions on 5.4 (2012): 551-563.*

Chard, Kyle, et al. "Social cloud: Cloud computing in social networks." Cloud Computing (CLOUD), 2010 IEEE 3rd International Conference on. IEEE, 2010.*

Forde, Timothy K., Irene Macaluso, and Linda E. Doyle. "Exclusive sharing & virtualization of the cellular network." New Frontiers in Dynamic Spectrum Access Networks (DySPAN), 2011 IEEE Symposium on. IEEE, 2011.*

Altmann, Jorn, et al. "GridEcon: A market place for computing resources." Grid Economics and Business Models. Springer Berlin Heidelberg, 2008. 185-196.*

Chun, Brent N., et al. "Computational resource exchanges for distributed resource allocation." Unpublished) http://citeseerx.ist.psu.edu/viewdoc/summary (2004).*

(56) References Cited

OTHER PUBLICATIONS

Muthukrishnan, S. "Ad exchanges: Research issues." Internet and network economics. Springer Berlin Heidelberg, 2009. 1-12.*
Moller, Jan, et al., "Internal Network Security", Feb. 1, 2000-May 18, 2001, Retrieved from the Internet: <URL: http://www.daimi.au.dk/~fwiffo/thesis/>, 183 pages.
Primet, Pascale, et al.., "HIPCAL: State of the Art of OS and Network virtualization solutions for Grids", Sep. 14, 2007, 38 pages.
Wikipedia, "IPSec", [online] [retrieved on Jan. 4, 2011]. Retrieved from the Internet: <URL: http://en.wikipedia.org/wiki/IPsec/>, 8 pages.
Abdull, Alastairlrvine, et al. "Generic Routing Encapsulation", [online] [retrieved on Jan. 4, 2011]. Retrieved from the Internet: <URL: http://creativecommons.org/licenses/by-sa/3.0/>, 5 pages.
Farinacci et al., "RFC 2784: Generic Routing Encapsulation (GRE)", Mar. 2000, The Internet Society, 10 pages.
Kent et al., "RFC 4301: Security Architecture for the Internet Protocol", Dec. 2005, The Internet Society, 102 pages.
Wikipedia, "Domain Name System". [online] [Retrieved on Feb. 4, 2012]. Retrieved from the Internet: <URL: http://en.wikipedia.org/wiki/Domain_Name_System>, 13 pages.
Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.
Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.
Wikipedia. "OAuth." [online] [Retrieved on Jan. 20, 2011]. Retrieved from the Internet <URL: http://en.wikipedia.org/wiki/OAuth> , 3 pages.
Gowalla. "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling—Getting Started Guide—API Version Aug. 1, 2010. Amazon Web Services LLC, 2010, 20 pages.
Amazon Auto Scaling—Developer Guide—API Version Aug. 1, 2010. Amazon Web Services LLC, 2011, 62 pages.
Amazon CloudWatch—Developer Guide—API Version Aug. 1, 2010. Amazon Web Services LLC, 2010, 75 pages.
Benincosa. "Ganglia and Nagios, Part 2: Monitor enterprise clusters with Nagios—Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
Travostino, Franco, et al., Seamless Live Migration of Virtual Machines over the MAN/WAN, 2006, Elsevier Future Generation Computer Systems 2006, 10 pages.
'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.
Amazon Elastic Compute Cloud, User Guide, API Version Feb. 1, 2012, pp. 97-103, downloaded from http://docs.amazonwebservices.com/AWSEC2/latest/UserGuide/AESDG-chapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.
"IPsec". Creativecommons.org [online]. Creative Commons Attribution-Share Alike 3.0 Unported. [retrieved on Jan. 14, 2011]. Retrieved from the Internet<URL: http://creativecommons.org/licenses/by-sa/3.0/ >, pp. 1-8.
"Generic Routing Encapsulation". Creativecommons.org [online]. Creative Commons Attribution-Share Alike 3.0 Unported. [retrieved on Jan. 14, 2011]. Retrieved from the Internet:<URL: http://creativecommons.org/licenses/by-sa/3.0/ >, pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How To: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.

(56) References Cited

OTHER PUBLICATIONS

Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.

Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.

L. Gommans, et al., Token-Based Authorization of Connection Oriented Network Resources, 1st International Workshop on Networks for Grid Applications (GridNets 2004), Oct. 29, 2004; 8 pages.

Hyun, Ahn Ji, Authorized Officer for Korean Intellectual Property Office, International Search Report and Written Opinion for PCT/US2012/021846, International Search Report completed May 25, 2012, 8 pages.

Na, Lee Da, Authorized Officer for Korean Intellectual Property Office, International Search Report and Written Opinion for PCT/US2012/020954, International Search Report completed Aug. 23, 2012, 10 pages.

Alpern, B., "The Jalapeno virtual machine," IBM Systems Journal, Jan. 2000, vol. 39, Issue 1, pp. 211-238.

Bok, Jin Yo, Authorized Officer for Korean Intellectual Property Office, International Search Report and Written Opinion for PCT/US2012/029210, International Search Report completed Oct. 10, 2012, 2 pages.

Anonymous, Storage I/O Control Technical Overview and Consideration for Deployment VMware vSphere™ 4.1, Jan. 1, 2010, XP055044491, retrieved from the internet: URL: http://www.vmware.com/fled/pdf/techpaper/WMW-vSphere41-SIOC.pdf; [retrieved on Nov. 21, 2012], the entire document.

Cabellos et al., LISPmob: Mobile Networking through LISP, Apr. 2, 2012, 8 pages.

Steinmetz, Christof, Authorized Office for European Patent Office, International Search Report and Written Opinion for PCT/US2013/034140, completed Jun. 25, 2013, 21 pages.

Hehn, Eva, Authorized Office for European Patent Office, International Search Report and Written Opinion for PCT/US2013/027456, completed Jun. 24, 2013,11 pages.

Eng, Lili, Australian Government, IP Australia, Examiner's First Report for 2012200562, dated Jun. 4, 2012, 2 pages.

\* cited by examiner

ADVERTISING AUCTION SYSTEM

BACKGROUND

This specification relates to virtual machine communications and, in particular, advertising bidding using virtual machines.

Cloud computing is network-accessible computing in which typically large collections of servers housed in data centers or "server farms" provides computational resources and data storage as needed to remote end users. Some cloud computing services allow end users to run user-provided server software applications (e.g., e-commerce server application, web server, or file server) in the cloud. Some other cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on the server farm may simplify management of end user computing devices. Some cloud computing services allow end users to execute software applications in virtual machines.

SUMMARY

The system described can efficiently implement a real-time bidding solution. The system can achieve this by placing bidders and an advertisement exchange on the same internal network. Using custom communication protocols, the advertisement exchange also can quickly communicate to a network of virtual machines through a load balancer. The load balancer communicates with a virtual machine through a host operating system. In this way, the virtual machine can place bids with the advertisement exchange.

In general, one innovative aspect of the subject matter described in this specification can be embodied in methods that include the actions of operating one or more bidders on the data processing apparatus, each bidder executing in a distinct virtual machine that is a hardware virtualization and wherein the virtual machines are hosted by a host operating system that executes on the data processing apparatus, wherein the host operating system performs operations comprising: receiving an advertisement bid request from a requestor using a first communication protocol, the bid request identifying a bidder of the one or more bidders, wherein the data processing apparatus and the ad exchange are on a same internal network; sending the advertisement bid request to the virtual machine of the identified bidder using a second communication protocol; receiving an advertisement bid response for the bid request from the identified bidder using the second communication protocol; and sending the advertisement bid response to the requestor using the first communication protocol. Other embodiments of this aspect include corresponding systems, apparatus, and computer programs, configured to perform the actions of the methods, encoded on computer storage devices.

These and other embodiments can each optionally include one or more of the following features. Sending the advertisement bid request to the virtual machine further comprises creating a new advertisement bid request in a different format than the advertisement bid request and sending the new advertisement bid request to the virtual machine. Sending the advertisement bid response to the requestor further comprises creating a new advertisement bid response in a different format than the advertisement bid response and sending the new advertisement response to the requestor. The first protocol can be a Remote Procedure Call protocol. The second protocol can use shared memory to communicate data between the host operating system and the identified bidder. The advertisement bid request can include bid information and the advertisement bid response includes one or more of a bid amount and an advertisement that will be shown. The bid information comprises one or more of a cookie, offer price, and a uniform resource locator for a web page on which an advertisement will be placed. The requestor can select the bidder using a load balancing algorithm. The load balancing algorithm can select a bidder based on random selection, round-robin selection, work load of the bidder, or latency of the bidder. The requestor can be an ad exchange. The first and second protocols can be different.

Particular embodiments of the subject matter described in this specification can be implemented so as to realize one or more of the following advantages. The system can efficiently communicate with virtual machines to support real-time bidding by reducing latency between an advertisement exchange and bidders. The system can support an advertisement exchange and bidders on the same internal network. A bidder can be represented as one or more virtual machines. Therefore, a bidder does not need to implement the bidder's own load balancing solution or establish the bidder's own server to respond to the advertisement exchange. Another advantage is that the advertisement exchange can communicate with external servers and process external requests. The advertisement exchange can manage simultaneous bids between virtual machines using a load balancer. The load balancer can use statistics (e.g., latency measurements) to manage load. Another advantage is that the system can dynamically add more virtual machines based on load statistics. Yet another advantage is that the load balancer can consider whether a virtual machine, host machine, or network is overloaded in determining how to manage load. Host operating systems can quickly communicate with virtual machines using Transmission Control Protocol (TCP) or paravirtualized socket support to reduce latency.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
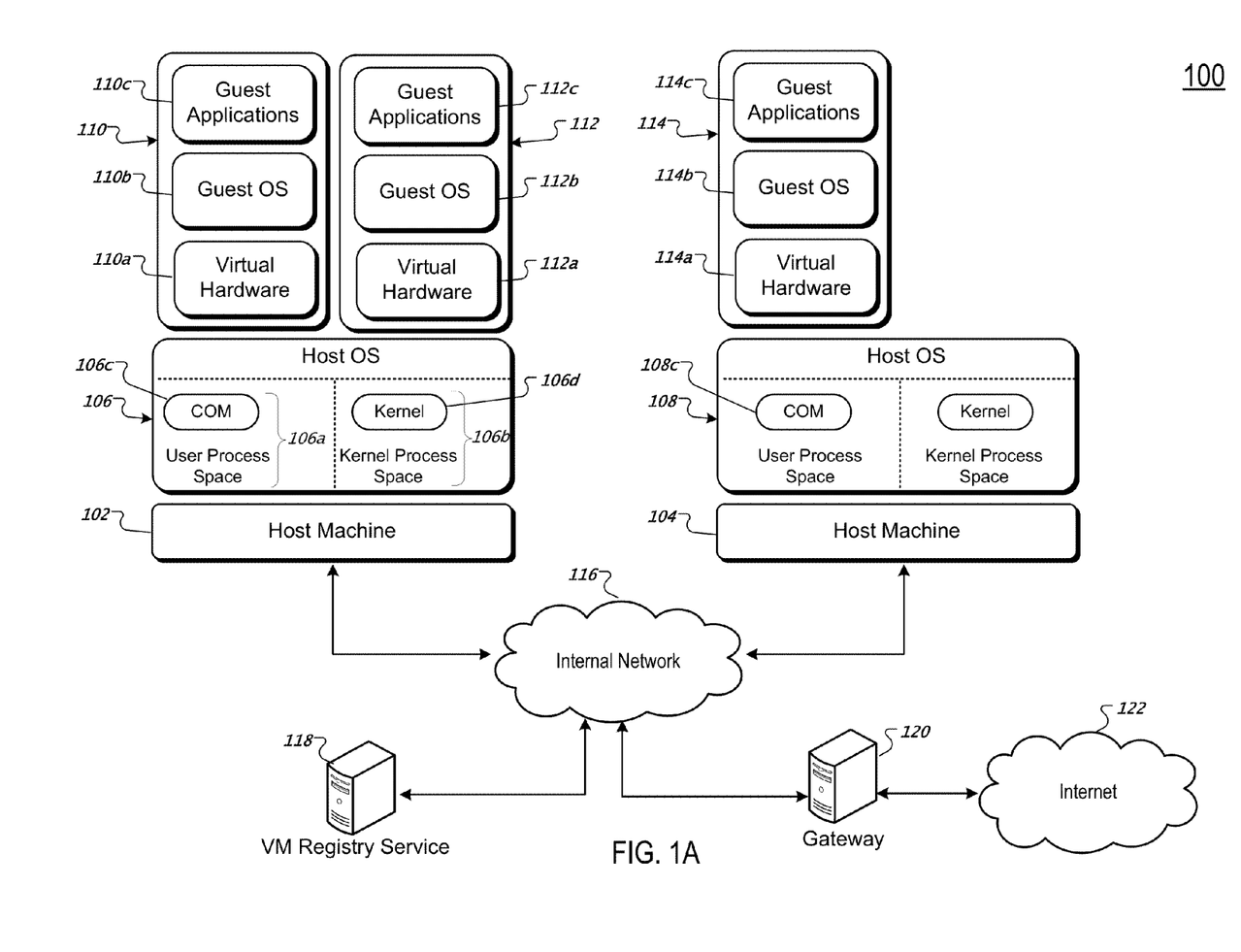
FIG. 1A is a schematic illustration of an example virtual machine system.

FIG. 1A is a schematic illustration of an example virtual machine system 100. The system 100 includes one or more host machines such as, for example, host machine 102 and host machine 104. Generally speaking, a host machine is one or more data processing apparatus such as rack mounted servers or other computing devices. The data processing apparatus can be in different physical locations and can have different capabilities and computer architectures. Host machines can communicate with each other through an internal data communications network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatus responsible for routing data communication traffic between the internal network 116 and the external network 122. Other types of external networks are possible.

Each host machine executes a host operating system or other software that virtualizes the underlying host machine hardware and manages concurrent execution of one or more virtual machines (e.g., a virtual machine monitor or hypervisor). For example, the host operating system 106 is managing virtual machine (VM) 110 and VM 112, while host OS 108 is managing a single VM 114. Each VM includes a simulated version of the underlying host machine hardware, or a different computer architecture. The simulated version of the hardware is referred to as virtual hardware (e.g., virtual hardware 110a, 112a and 114a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers. Other address schemes are possible.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c). In some implementations, the communication process executes in the user process space (e.g., user process space 106a) of a host operating system (e.g., host operating system 106). In other implementations, the communication process can execute in the kernel process space (e.g., kernel process space 106d) of the host operating system or be implemented in hardware. There can be a single communication process for all VMs executing on a host machine or multiple communication processes, one for each VM executing on a host machine. In yet further implementations, some portion of the communication process executes in the user process space and another portion executes in the kernel process space. The communication process communicates with a directory service (e.g., VM registry service 118) in order to establish a virtual network pair (VNP) between two VMs. A virtual network pair (VNP) is a logical computer network that is implemented on top of one or more physical (wired or wireless) computer networks. A VNP can be implemented with a tunneling protocol, for example. A VNP routes traffic between two endpoints using one or more virtual connections or links. By way of illustration, a VNP between virtual machine 110 and virtual machine 114 would route packets sent between VNP endpoints managed respectively by communication processes 106c and 108c over internal network 116. The VM registry service 118 is one or more data processing apparatus that execute software for keeping track of assignments of network addresses (e.g., IP addresses) to VMs, and for keeping track of network addresses (e.g., IP addresses) of host machines that the VMs are executing on. The data processing apparatus can be in different locations and can have different capabilities and computer architectures.

Figure 1B:
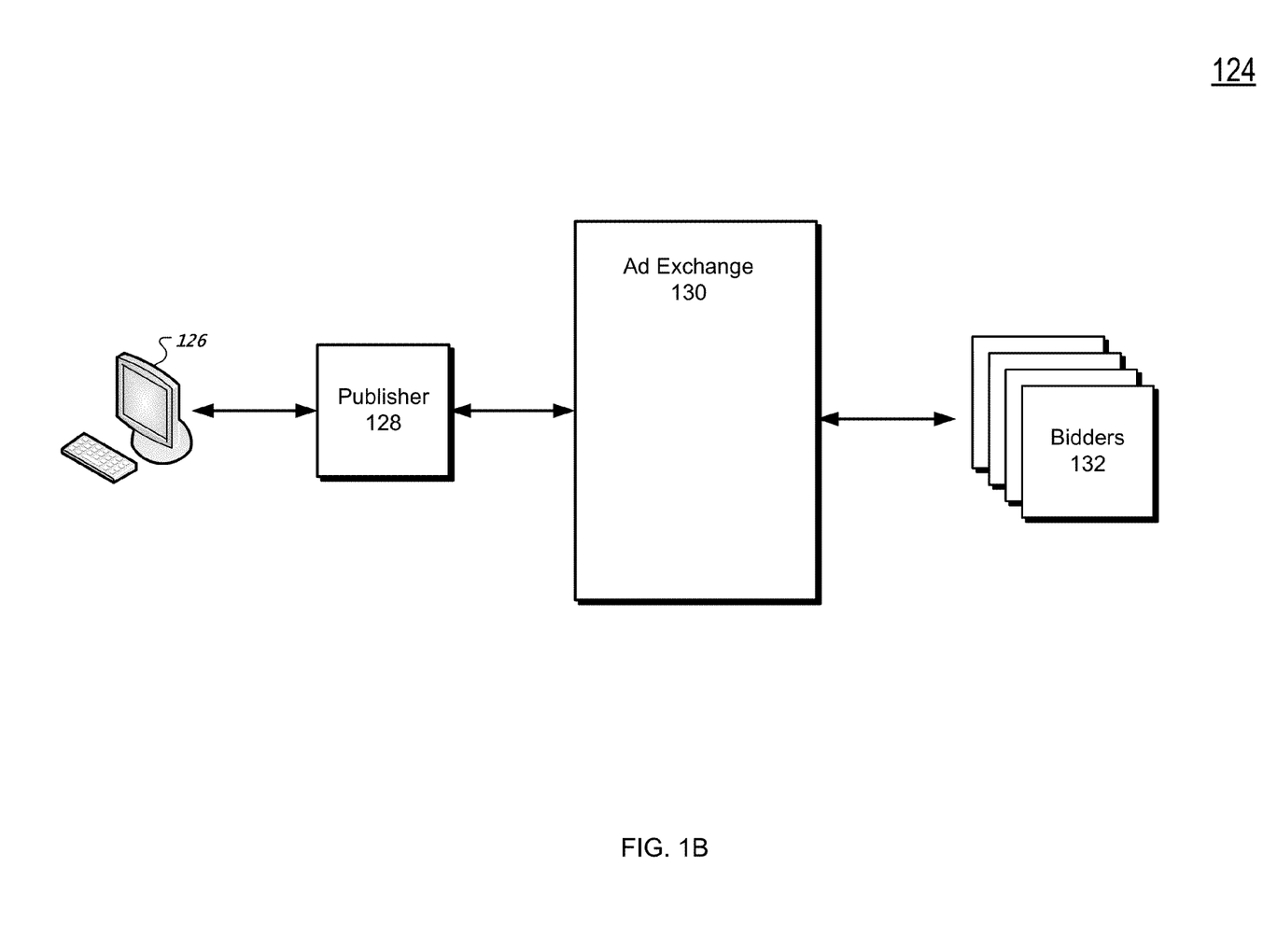
FIG. 1B is a schematic diagram of an example bidding system.

FIG. 1B is a schematic diagram of an example bidding system 124. The system 124 can support real-time bidding for advertisement placements or placement of other assets. In some implementations, a user having a user device 126 (e.g., a data processing apparatus such as a smart phone or a portable computer) views a resource provided by a publisher 128 server. Resources can be web pages, mobile applications, videos, electronic games, electronic books, documents, or other types of content. The resource can include executable instructions such as JavaScript or other information, for example, that causes an advertisement to be fetched and provided with the content of the resource.

In some implementations, when the user device 126 processes the resource, the user device can send a request to a server specified in the instructions of the resource for the server to provide an advertisement to the user device 126. In response, the publisher 128 can fetch the advertisement and subsequently send the advertisement to the user device 126. Alternatively, the publisher 128 can obtain the advertisement before sending the resource to the user device 126 and provide the advertisement with the resource. In some implementations, the advertisement is chosen by an advertisement exchange 130 (or "ad exchange"). The ad exchange 130 is a system that facilitates the buying and selling of advertisements through an automated auction. The ad exchange 130 communicates with one or more bidders 132 (e.g., data processing apparatus) to auction an advertisement spot for placement with a resource by sending bid requests to the bidders 132. Bidders 132 respond with bid responses. Bidders 132 can be part of advertisement networks that serve ads for multiple clients, or bidders 132 can be individual entities running advertisement campaigns. If a bidder wins an auction, the ad exchange 130 provides the bidder's advertisement to the publisher 128, which in turn sends the advertisement to the user device 126. The user can then view the advertisement using the user device 126. Because the user device 126, publisher 128, ad exchange 130, and bidders 132 can be different machines in different geographic locations, network latency can delay the delivery of the advertisements to the user device 126.

Figure 2:
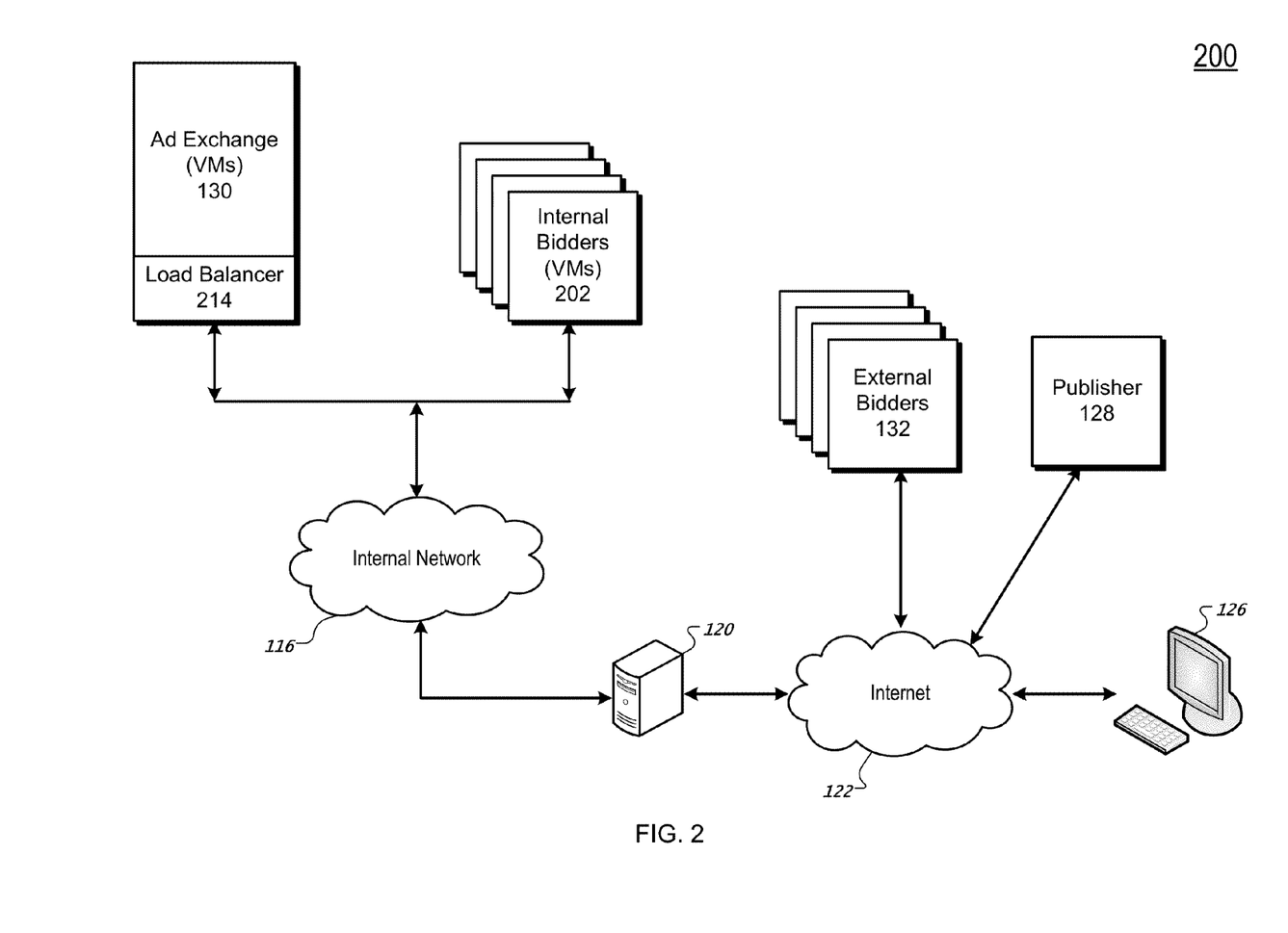
FIG. 2 is a schematic illustration of an example system that provides efficient communication between virtual machines to support real-time bidding.

FIG. 2 is a schematic illustration of an example system 200 that provides efficient communication between virtual machines to support real-time bidding. To reduce latency, the system 200 includes the internal network 116 that facilitates communication between the ad exchange 130 and internal bidders 202 without requiring their communications to flow over the public Internet 122. By decreasing latency between the ad exchange 130 and the internal bidders 202, the overall advertisement serving latency experienced by the user device 126 can be reduced. This also allows the internal bidders 202 to run more complex algorithms and better determine how to respond to a bid request from the ad exchange 130. In various implementations, the ad exchange 130 is implemented as one or more VMs (e.g., VM 110, VM 114).

When the ad exchange 130 receives a request to fetch an advertisement from a publisher, the ad exchange 130 can send bid requests to advertisers or aggregators that have requested to receive bids. Each advertiser or aggregator can be associated with a group of bidders. The ad exchange 130 can direct a bid request to one or more bidders within the group of bidders. In some implementations, the one or more bidders are selected based partially on the content of the advertisement. Bidders can reside in an internal network 116 (e.g., internal bidders 202) or outside of the internal network 116 (e.g., external bidders 132). In various implementations, internal bidders 202 are implemented using one or more virtual machines (e.g., VM 110, VM 114). External bidders 132 can be implemented using data processing apparatus (e.g., servers). Communication between the ad exchange 130 and the external bidders 132 travels over the Internet 122 and through zero or more gateways 120, which can introduce latency in the communications.

The ad exchange 130 can send bid requests to numerous bidders and simultaneously process incoming bid responses from bidders using a load balancer 214. The load balancer 214 can subscribe to a directory of available bidders. The directory of available bidders can include a directory of internal bidders 202 and, optionally, external bidders 132. In the case of internal bidders 202, the directory can include the identification of the virtual machine (s) used by a given internal bidder. The directory of bidders can be managed by the VM Registry Service 118, for example.

After the ad exchange 130 selects an advertiser or aggregator, the load balancer 214 can select one or more of an internal bidder (e.g., via a VM's address) and an external bidder (e.g., via an Internet Protocol "IP" address) associated with the advertiser or aggregator. In some implementations, the load balancer 214 selects a bidder using a selection algorithm. The selection algorithm can utilize random selection of bidders or selection through a round robin of bidders, for example. Other selection techniques are possible. In some implementations, internal bidders 202 publish the amount of work (or "load") they are performing to the load balancer 214, and the load balancer 214 selects one or more internal bidders having the lightest load. In some implementations, the load balancer 214 periodically checks the load of each internal bidder and selects one or more of the internal bidders 202 having the lightest load. In some implementations, the load balancer 214 records the latency of an internal bidder's responses to bid requests over time and increases or decreases an estimation of the internal bidder's load based on the latency. In some implementations, the algorithm is a hybrid of one or more of the above techniques.

In some implementations, the load balancer 214 communicates with each internal bidder through the internal bidder's host operating system (e.g., host operating system 106). Each internal bidder (e.g., a VM) is associated with a host operating system. For example, VM 110 is monitored by host operating system 106. Likewise, VM 114 is monitored by host operating system 108. A host operating system can be the primary interface between the internal bidder and the load balancer. The host operating system of an internal bidder can ensure the internal bidder is running. In some implementations, once an internal bidder is selected, the load balancer 214 communicates to the host operating system of the selected internal bidder using a remote procedure call (RPC), for example. RPC is an inter-process communication that can be used to allow a computer program executing on one computer to cause a method, function, subroutine or procedure to execute on another computer on a shared network without the programmer explicitly having to code the details of how information is communicated to the other computer. In further implementations, the load balancer 214 communicates with the host operating system of the selected internal bidder using a switched fabric networking technology like infiniband, or other hardware accelerated networking solutions.

Figure 3:
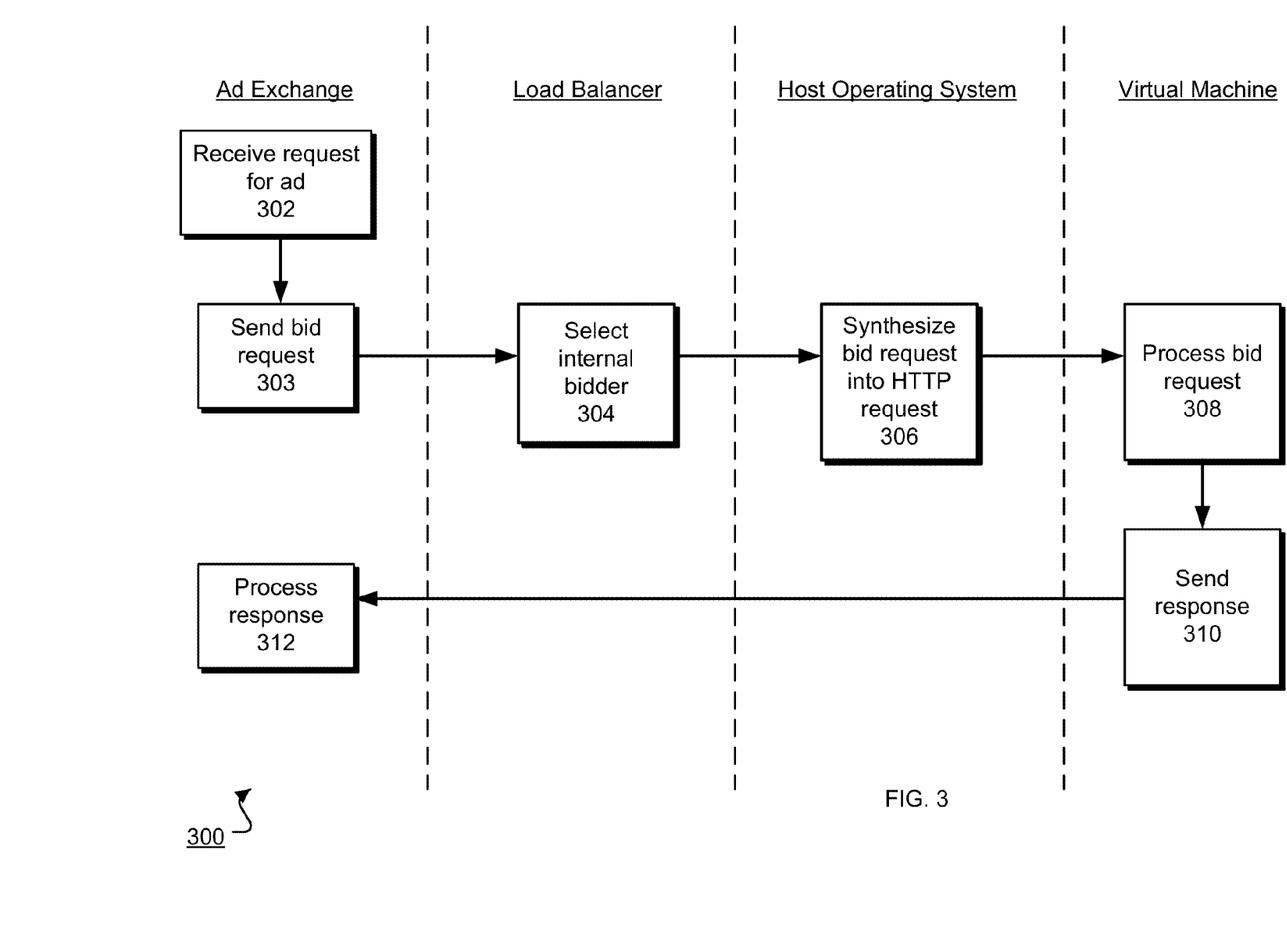
FIG. 3 is a flow chart of an example method of processing an advertisement exchange's bid request with an internal bidder.

FIG. 3 is a flow chart of an example method 300 of processing an ad exchange's bid request with an internal bidder. As mentioned above, the ad exchange (e.g., ad exchange 130) first receives a request to serve an advertisement 302. The ad exchange can select advertisers or aggregators interested in bidding for the request. After selecting an advertiser or aggregator, the ad exchange then sends a bid request to the load balancer 303 (e.g., load balancer 214) using RPC. In some implementations, the ad exchange sends a bid request for each advertiser or aggregator. The load balancer selects one or more internal bidders (e.g., internal bidders 202) on the internal network associated with the advertiser or aggregator, as described above 304. The load balancer communicates to the selected internal bidder(s) through each internal bidder's host operating system. The host operating system converts the RPC request to a network protocol request that the internal bidder can process. For example, the host operating system can form an HTTP request that the internal bidder can process 306. The host operating system can communicate the bid request to the internal bidder in multiple ways as will be described further below. In some implementations, a bid request includes bid information about the request to fetch an advertisement (e.g., a cookie) and a page URL that will be displaying the advertisement. Once the internal bidder processes the bid request to generate a bid response 308, the internal bidder sends the bid response to the ad exchange 310. For example, after receiving a bid request that asks for $0.25 to display an advertisement, the internal bidder can process the amount and generate a 'yes' or a 'no' to send back to the ad exchange. The bid response can also include the bid amount and the actual advertisement that will be shown. The ad exchange can then process the bid response by sending more bid requests to multiple internal or external bidders, or the ad exchange can select a winner of the auction 312. In some implementations, the bid response uses the same protocols that the bid request uses.

Figure 4:
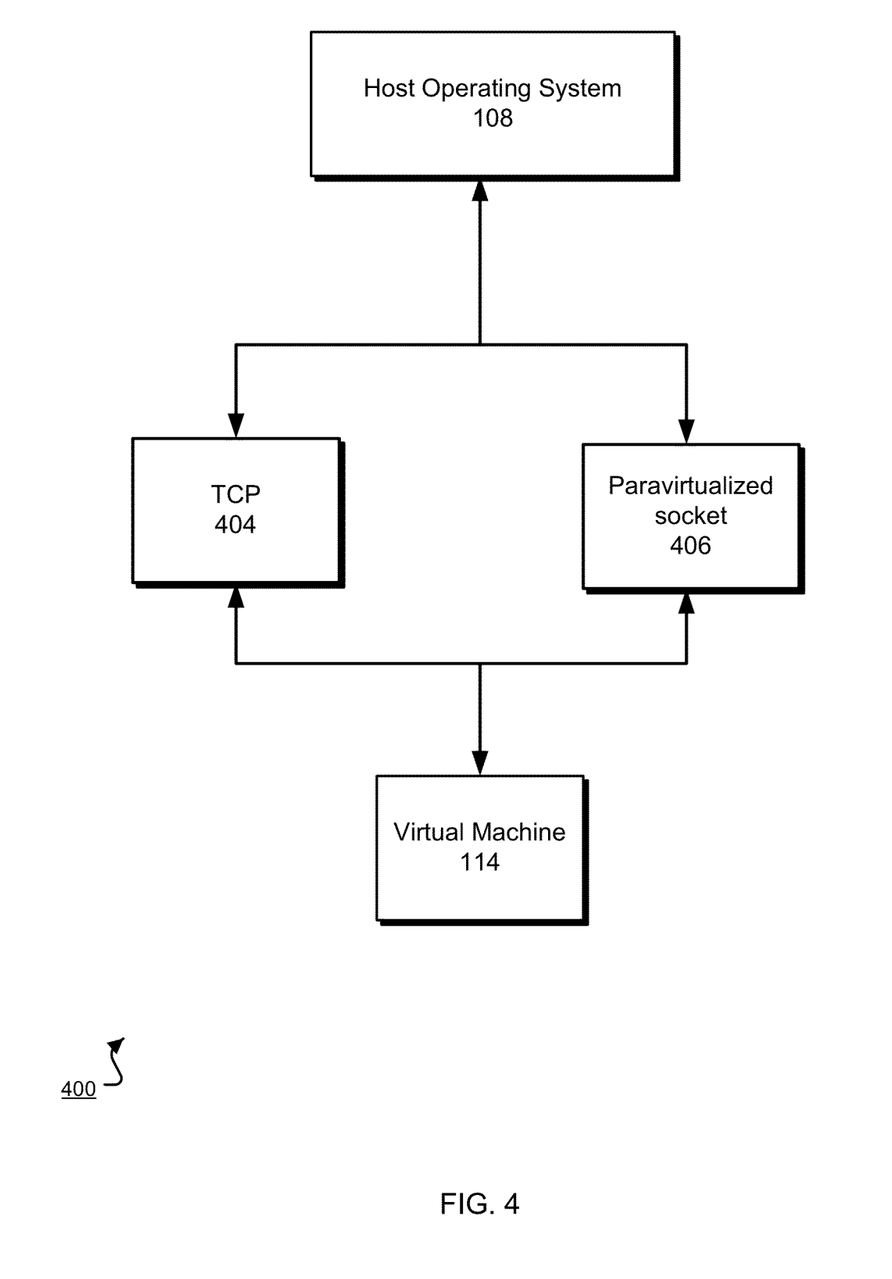
FIG. 4 is a flow chart of an example method of communicating between a host operating system and a virtual machine.

FIG. 4 is a flow chart of an example method 400 of communicating between a host operating system 108 and a VM 114 on a host machine (e.g., host machine 108). In some implementations, the host operating system 108 communicates with the VM 114 using Transmission Control Protocol (TCP) 404. As mentioned above, the host operating system can form an HTTP request that the VM 114 can process. The host operating system 108 can use standard TCP protocols to break down the HTTP request into one or more packets and communicate those packets to the VM 114. In other words, because VMs can simulate isolated environments, communicating using TCP requires both the VM 114 and the host operating system 108 to abide by standard protocols. On the other hand, communicating using TCP will not require modification to the host operating system 108. Communicating using TCP can also be optimized because TCP can benefit systems that are not physically close to each other by addressing issues inherent in a network environment. For example, TCP includes a reliable transmission functionality that ensures a packet is delivered over a network. However, here, because the VM 114 is on the same host machine as the host operating system 108, TCP's reliable transmission, error checking, and other functionality optimized for a network environment can be simplified for a single system environment to reduce latency.

In some implementations, the host operating system 108 communicates to the VM 114 using a paravirtualized socket 406. Using a paravirtualized socket is a virtualization technique that presents a software interface to virtual machines that is optimized for a virtualized environment. A paravirtualized socket can remove latency issues introduced by using a protocol like TCP. For example, a paravirtualized socket can require much less hardware emulation and can reduce the number of slow transitions out of the VM's context, thus improving the efficiency of the communication. A paravirtualized socket can also allow the host operating system 108 and the VM 114 to communicate without requiring network error checking and network error recovery. In some implementations, a paravirtualized socket can utilize a shared memory ring buffer between the host operating system 108 and the VM 114. The host operating system 108 can send and receive the data from the VM 114 using the shared memory ring buffer. In some implementations, a shared memory buffer is a special section of memory that is mapped into both the VM and the host operating system. A ring buffer allows the VM and host operating system to both be reading and writing at the same time with a minimum of copying. In some implementations, to ensure compatibility, the kernel of the VM 114 creates packets encapsulating the data from the shared memory ring buffer to mimic a protocol such as TCP.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., advertisement hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:

operating one or more bidders on the one or more data processing apparatus that operate on an internal network that includes an advertisement exchange, each bidder executing in a distinct virtual machine that is a hardware virtualization and wherein the virtual machines are hosted by a host operating system that executes on the one or more data processing apparatus, wherein the host operating system performs operations comprising:

receiving, by the one or more data processing apparatus, an advertisement bid request from the advertisement exchange using a first communication protocol, the bid request identifying a bidder of the one or more bidders and an identifier associated with a client device operating on an external network that is different from the internal network;

sending the advertisement bid request to the virtual machine of the identified bidder using a second communication protocol that is different from the first communication protocol;

receiving an advertisement bid response for the bid request from the identified bidder using the second communication protocol; and sending the advertisement bid response to the advertisement exchange using the first communication protocol.

2. The method of claim 1 wherein sending the advertisement bid request to the virtual machine further comprises creating a new advertisement bid request in a different format than the advertisement bid request and sending the new advertisement bid request to the virtual machine.

3. The method of claim 1 wherein sending the advertisement bid response to the requestor further comprises creating a new advertisement bid response in a different format than the advertisement bid response and sending the new advertisement response to the requestor.

4. The method of claim 1 wherein the first protocol is a Remote Procedure Call protocol.

5. The method of claim 1 wherein the second protocol uses shared memory to communicate data between the host operating system and the identified bidder.

6. The method of claim 1 wherein the advertisement bid request includes bid information and the advertisement bid response includes one or more of a bid amount and an advertisement that will be shown.

7. The method of claim 6 wherein the bid information comprises one or more of a cookie, offer price, and a uniform resource locator for a web page on which an advertisement will be placed.

8. The method of claim 1 wherein the advertisement exchange selects the bidder using a load balancing algorithm.

9. The method of claim 8 wherein the load balancing algorithm can select a bidder based on random selection, round-robin selection, work load of the bidder, or latency of the bidder.

10. The method of claim 1 wherein the advertisement exchange operates on the internal network and on a data processing apparatus that is different from the one or more data processing apparatus, and wherein the advertisement exchange performs operations comprising:

receiving, from the client device operating on the external network that is different from the internal network, an advertisement request; and sending, using the first communication protocol, the advertisement bid request to the one or more data processing apparatus that operate on the internal network.

11. A system comprising:

one or more data processing apparatus; and computer-readable medium coupled to the one or more data processing apparatus and having instructions stored thereon, which, when executed by the one or more data processing apparatus, cause the one or more data processing apparatus to perform operations comprising:

operating one or more bidders on the one or more data processing apparatus that operate on an internal network that includes an advertisement exchange, each bidder executing in a distinct virtual machine that is a hardware virtualization and wherein the virtual machines are hosted by a host operating system that executes on the one or more data processing apparatus, wherein the host operating system performs operations comprising:

receiving, by the one or more data processing apparatus, an advertisement bid request from the advertisement exchange using a first communication protocol, the bid request identifying a bidder of the one or more bidders and an identifier associated with a client device operating on an external network that is different from the internal network;

sending the advertisement bid request to the virtual machine of the identified bidder using a second communication protocol that is different from the first communication protocol;

receiving an advertisement bid response for the bid request from the identified bidder using the second communication protocol; and sending the advertisement bid response to the advertisement exchange using the first communication protocol.

12. The system of claim 11 wherein sending the advertisement bid request to the virtual machine further comprises creating a new advertisement bid request in a different format than the advertisement bid request and sending the new advertisement bid request to the virtual machine.

13. The system of claim 11 wherein sending the advertisement bid response to the requestor further comprises creating a new advertisement bid response in a different format than the advertisement bid response and sending the new advertisement response to the requestor.

14. The system of claim 11 wherein the first protocol is a Remote Procedure Call protocol.

15. The system of claim 11 wherein the second protocol uses shared memory to communicate data between the host operating system and the identified bidder.

16. The system of claim 11 wherein the advertisement bid request includes bid information and the advertisement bid response includes one or more of a bid amount and an advertisement that will be shown.

17. The system of claim 16 wherein the bid information comprises one or more of a cookie, offer price, and a uniform resource locator for a web page on which an advertisement will be placed.

18. The system of claim 11 wherein the advertisement exchange selects the bidder using a load balancing algorithm.

19. The system of claim 18 wherein the load balancing algorithm can select a bidder based on random selection, round-robin selection, work load of the bidder, or latency of the bidder.

20. The system of claim 18, wherein the advertisement exchange operates on the internal network and a data processing apparatus that is different from the one or more data processing apparatus, and wherein the advertisement exchange performs operations comprising:

receiving, from the client device operating on the external network that is different from the internal network, an advertisement request; and sending, using the first communication protocol, the advertisement bid request to the one or more data processing apparatus that operate on the internal network.

21. A non-transitory computer-readable medium having instructions stored thereon, which, when executed by one or more data processing apparatus, cause the one or more data processing apparatus to perform operations comprising:

operating one or more bidders on the one or more data processing apparatus that operate on an internal network that includes an advertisement exchange, each bidder executing in a distinct virtual machine that is a hardware virtualization and wherein the virtual machines are hosted by a host operating system that executes on the one or more data processing apparatus, wherein the host operating system performs operations comprising:

receiving, by the one or more data processing apparatus, an advertisement bid request from the advertisement exchange using a first communication protocol, the bid request identifying a bidder of the one or more bidders and an identifier associated with a client device operating on an external network that is different from the internal network;

sending the advertisement bid request to the virtual machine of the identified bidder using a second communication protocol that is different from the first communication protocol;

receiving an advertisement bid response for the bid request from the identified bidder using the second communication protocol; and sending the advertisement bid response to the advertisement exchange using the first communication protocol.

22. The computer-readable medium of claim 21 wherein sending the advertisement bid request to the virtual machine further comprises creating a new advertisement bid request in a different format than the advertisement bid request and sending the new advertisement bid request to the virtual machine.

23. The computer-readable medium of claim 21 wherein sending the advertisement bid response to the requestor further comprises creating a new advertisement bid response in a different format than the advertisement bid response and sending the new advertisement response to the requestor.

24. The computer-readable medium of claim 21 wherein the first protocol is a Remote Procedure Call protocol.

25. The computer-readable medium of claim 21 wherein the second protocol uses shared memory to communicate data between the host operating system and the identified bidder.

26. The computer-readable medium of claim 21 wherein the advertisement bid request includes bid information and the advertisement bid response includes one or more of a bid amount and an advertisement that will be shown.

27. The computer-readable medium of claim 26 wherein the bid information comprises one or more of a cookie, offer price, and a uniform resource locator for a web page on which an advertisement will be placed.

28. The computer-readable medium of claim 21 wherein the advertisement exchange selects the bidder using a load balancing algorithm.

29. The computer-readable medium of claim 28 wherein the load balancing algorithm can select a bidder based on random selection, round-robin selection, work load of the bidder, or latency of the bidder.

30. The computer-readable medium of claim 21, wherein the advertisement exchange operates on the internal network and a data processing apparatus that is different from the one or more data processing apparatus, and wherein the advertisement exchange performs operations comprising:

receiving, from the client device operating on the external network that is different from the internal network, an advertisement request; and sending, using the first communication protocol, the advertisement bid request to the one or more data processing apparatus that operate on the internal network.

* * * * *